(12) United States Patent
Saltzman et al.

(10) Patent No.: US 8,458,051 B1
(45) Date of Patent: Jun. 4, 2013

(54) SYSTEM, METHOD AND COMPUTER PROGRAM OF MANAGING SUBSCRIPTION-BASED SERVICES

(75) Inventors: Brian J. Saltzman, Seattle, WA (US); J. Eric Docktor, Seattle, WA (US); Neil C. Roseman, Seattle, WA (US)

(73) Assignee: Amazon Technologies, Inc., Reno, NV (US)

( * ) Notice: Subject to any disclaimer, the term of this patent is extended or adjusted under 35 U.S.C. 154(b) by 1585 days.

(21) Appl. No.: 11/731,779

(22) Filed: Mar. 30, 2007

(51) Int. Cl.
*G06Q 30/00* (2012.01)

(52) U.S. Cl.
USPC ........................... 705/26.7; 705/14.26

(58) Field of Classification Search
CPC ..................................... G06Q 30/00
USPC ............................ 705/14.26, 26.7
See application file for complete search history.

(56) References Cited

U.S. PATENT DOCUMENTS

| | | | |
|---|---|---|---|
| 7,089,592 B2* | 8/2006 | Adjaoute | 726/25 |
| 7,433,835 B2* | 10/2008 | Frederick et al. | 705/26.1 |
| 2003/0158751 A1* | 8/2003 | Suresh et al. | 705/2 |
| 2003/0204449 A1* | 10/2003 | Kotas et al. | 705/27 |
| 2005/0049932 A1 | 3/2005 | Howell, Jr. et al. | |
| 2005/0094812 A1* | 5/2005 | Terekhova et al. | 380/201 |
| 2005/0125389 A1* | 6/2005 | Hazzard et al. | 707/3 |
| 2005/0165656 A1* | 7/2005 | Frederick et al. | 705/26 |
| 2007/0005417 A1* | 1/2007 | Desikan et al. | 705/14 |
| 2007/0129999 A1* | 6/2007 | Zhou et al. | 705/14 |
| 2007/0174214 A1* | 7/2007 | Welsh et al. | 705/405 |
| 2008/0008348 A1* | 1/2008 | Metois et al. | 382/100 |
| 2008/0066188 A1* | 3/2008 | Kwak | 726/28 |
| 2008/0154668 A1* | 6/2008 | Kuo et al. | 705/7 |
| 2009/0113545 A1* | 4/2009 | Pic et al. | 726/22 |

OTHER PUBLICATIONS

BusinessWire, "Sprint Adopts HNC Software to Minimize Credit Risk; Early-Life Credit Monitoring System Reduces Fraud, Helps Improve Service to Customers Business Editors", Nov. 9, 1998.*
BusinessWire2, "Lightbridge to Support BTE'S InstantID and AirWaves Score; Fraud Sentinel's True Identity Fraud and Risk Assessment Capabilities to be Enhanced Business/Technology Editors CTIA Wireless 99 Booth # 5437F", Feb. 8, 1999.*
Richards, Bob, "Hackers Can Make Even Ebay a Risky Deal: [All Edition]", Madison Capital Times [Madison, Wis] Aug. 24, 2002.*

* cited by examiner

*Primary Examiner* — Mark Fadok
(74) *Attorney, Agent, or Firm* — Lee & Hayes, PLLC

(57) ABSTRACT

A method of managing subscription-based services is disclosed and includes receiving configuration data from a third-party service provider at a subscription service management system, where the configuration data indicates details of a subscription-based service plan to be fulfilled by the third-party service provider. The method also includes receiving a request from a consumer to receive a service corresponding to the subscription-based service plan, where the request is received at the subscription service management system via an online site. The method also includes activating the service on behalf of the consumer, wherein the consumer is to receive the service during the subscription period. Further, the method includes sending at least one message to the third-party service provider during the subscription period, wherein the at least one message is related to a time-based trigger event associated with the subscription-based service plan.

17 Claims, 12 Drawing Sheets

| Field | Data Type | Description |
|---|---|---|
| *Plan Creation API* | | |
| Service Provider ID | String | Identifies the Service Provider |
| Description | String | Describes the plan |
| Soft Descriptor | String | Text that will appear on credit card statement for any charges for the plan |
| Lookup Token | String | Identifier that provider can use to reference plan in lookups |
| normalScheduleItem | ScheduleItemRequest | Defines the period, price and description of subscription plan, plus any promotions for the normal billing periods |
| overrideScheduleItems | OverrideScheduleItemRequest | Defines override periods (e.g. Free Trial) including which periods should have this override, the override price, any promotions associated with the override period, and the description |
| Coupons | PromotionRequest | Defines Amazon retail coupons that should be applied to subscribers account |
| Restrictions | RestrictionType<br><br>[ChargeAnyInstrumentEnabled \| MustHaveEmailID \| MustHavePaymentID \| MustHaveShippingAddressID \| NoVetOnPPlanChangeWhenActive \| OnlyOneSubPerCustomerID \| VetOnCreationComplete \| VetOnPaymentPlanChange \| VetOnReactivate] | Setting these and other possible restrictions changes the behavior of the subscription plan as described |
| UserCancelReasons | String | Service Providers can create zero or more userCancelReasons to be presented to user when user cancels a subscription. User can pick from list to describe reason(s) for canceling |
| emailTemplates | EmailTemplateRequest | Service Providers can configure which emails to send in certain scenarios. These emails are created using this field |
| cancelRules | CancelRuleRequest | Service providers can configure the system to cancel customers in certain conditions (e.g. if they don't resolve their billing problems in a certain amount of time) |
| Metadata | MetadataRequest | Service Providers can add optional additional information on their plans using key-value pairs |

FIG. 10A

| Field | Data Type | Description |
|---|---|---|
| *Other Data Objects* | | |
| ScheduleItemRequest | | |
| time interval | TimeInterval [Minute \| Hour \| Day \| Week \| Month \| Year] | The units for the time interval that will comprise the schedule item |
| numberOfIntervals | integer | The number of timeInterval units that comprise this schedule item |
| planOffers | OfferRequest | The Offer associated with this schedule item |
| discounts | PromotionRequest | Any promotions/discounts to be applied to this schedule item |
| OfferRequest | | |
| benefit | BenefitRequest | The actual benefit being provided to the consumer |
| price | decimal | The price to be charged to the customer (before any discounts) |
| PaymentCollectionType | PaymentCollectionType [StartofPeriod \| EndofPeriod] | Whether the price should be charged before the billing period ("bill in advance") or at the end of the billing period ("bill in arrears") |
| productTaxCode | integer | If tax is to be charged, the tax code to be passed to the Amazon tax system |
| taxRateClass | TaxRateClass [Reduced \| Mixed \| Standard] | If tax is to be charged, the tax rate class to be passed to the Amazon tax system |
| vendorCode | string | Vendor code to which revenue should be attributed, if a Vendor is to be paid for some/all of the subscription revenue |
| PromotionRequest | | |
| deductionType | PromotionDeductionType [Amount \| Percent] | Whether the promotion amount should be subtracted from the price ("Amount"), or whether the amount should be reduced by the given percentage ("Percent") |
| deductionValue | decimal | The value of the promotion, either as a raw amount or a percentage discount |
| promotionID | integer | The ID of the promotion to which the promotion costs should be attributed |
| BenefitRequest | | |
| description | string | A description of the benefit being provided to customers |
| productGroup | integer | The business product group offering the benefit (e.g. Media, Hardlines) |
| OverrideScheduleItemRequest | | |
| scheduleItem | ScheduleItemRequest | The schedule item details for the override period |
| overrideStartPeriodNumber | integer | Which period number this override should start |
| overrideEndPeriodNumber | integer | Which period number this override ceases |
| EmailTemplateRequest | | |
| emailTypeName | string | name of email type |
| templateURL | string | URL on Amazon web site where email template lives |
| templateType | string | |
| fromRealName | string | Name to be used in the email "From" field |
| fromEmailAddress | string | Email address to be used in email "Sender" field |
| MetadataRequest | | |
| key | string | The provider-defined key with which the provider would like to look up the associated value |
| value | string | Value associated with the provider-defined key |

*FIG. 10B*

| | | |
|---|---|---|
| 3/21/2007 | Dear Service Provider No. 1,<br>First magazine issue is due to Consumer A in five days | |
| 3/23/2007 | Dear Service Provider No. 1,<br>First subscription payment was due from Consumer A two days ago | |
| 3/25/2007 | Dear Service Provider No. 2,<br>Reset monthly cell phone minutes for Consumer B in seven days | |
| 3/27/2007 | Dear Consumer B,<br>Your second monthly payment is due to Service Provider No. 2 on 4/1/2007 | |
| 4/1/2007 | Dear Service Provider No. 3,<br>Renewal period of shipping discount service for Consumer C begins today | |

SYSTEM, METHOD AND COMPUTER PROGRAM OF MANAGING SUBSCRIPTION-BASED SERVICES

FIELD OF THE DISCLOSURE

The present disclosure is generally related to managing subscription-based services.

BACKGROUND

Subscription-based services allow consumers to enjoy various interests regularly and allow service providers to receive regular service revenues over time. Some service providers may not have the facilities to manage certain aspects of subscription-based services, such as promotion, billing, and tracking fulfillment timetables for a large volume of subscription-based service plans. This can be particularly true where the service provider desires to provide multiple types of plans to consumers. Further, many service providers may not have the capabilities to make their subscription plans visible to consumers. Hence, there is a need for an improved system and method of managing subscription-based services.

BRIEF DESCRIPTION OF THE DRAWINGS

FIG. 10A is a diagram of an illustrative embodiment of an application programming interface data structure to receive subscription-based service plan configuration data;

FIG. 10B is a diagram of a second illustrative embodiment of an application programming interface data structure to receive subscription-based service plan configuration data; and FIG. 11 is a diagram of an illustrative embodiment of a time-based queue.

SUMMARY

Figure 1:
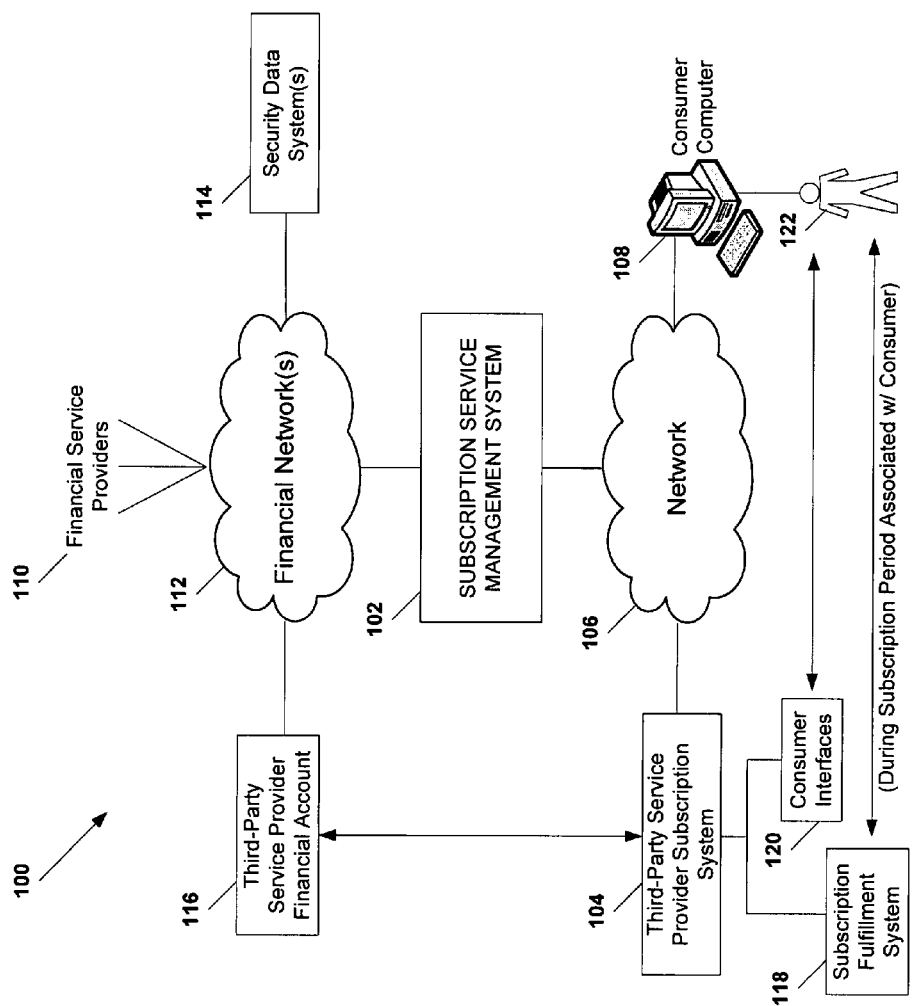
FIG. 1 is a block diagram of a particular embodiment of a system to manage subscription-based services.

A system to manage subscription-based services is disclosed and includes a server system having logic and memory accessible to the logic. The memory includes instructions executable by the logic to receive configuration data from a third-party service provider. The configuration data indicates details of a subscription-based service plan to be fulfilled by the third-party service provider. The memory also includes instructions executable by the logic to receive a request from a consumer for a service corresponding to the subscription-based service plan. The memory also includes instructions executable by the logic to activate a subscription period associated with the consumer, where the consumer is to receive the service in a plurality of service increments during the subscription period. Further, the memory includes instructions executable by the logic to send at least one message to the third-party service provider during the subscription period, where the at least one message is related to a time-based trigger event associated with the subscription-based service plan.

In another embodiment, a routine for managing subscription-based services is disclosed and includes receiving configuration data from a third-party service provider at a subscription service management system, where the configuration data indicates details of a subscription-based service plan to be fulfilled by the third-party service provider. The routine also includes receiving a request from a consumer to receive a service corresponding to the subscription-based service plan, where the request is received at the subscription service management system via an online site. The routine also includes activating the service on behalf of the consumer, wherein the consumer is to receive the service during the subscription period. Further, the routine includes sending at least one message to the third-party service provider during the subscription period, wherein the at least one message is related to a time-based trigger event associated with the subscription-based service plan.

In another embodiment, a routine for managing subscription-based services is disclosed and includes registering with a subscription service management system by providing third-party service provider identification data and account data via an account creation interface of an online site. The routine also includes providing details of a subscription-based service plan via a subscription-based service plan configuration interface of the online site. The routine also includes receiving data indicating an option to selectively offer or not offer the subscription-based service plan via the online site.

In another embodiment, a routine for managing subscription-based services is disclosed and includes receiving data at a subscription system via an interface to a third-party service provider. The data indicates a request from a consumer to activate a service associated with a subscription-based service plan of the third-party service provider. The routine also includes activating the service after the consumer has satisfied a pre-defined activation condition associated with the subscription-based service plan. The routine also includes sending data to a subscription service management system accessible via an online site, where the data sent to the subscription service management system indicates a subscription period associated with the service to be received by the consumer.

In another embodiment, a routine for managing subscription-based services is disclosed and includes providing a graphical user interface (GUI) to a consumer via an online site. The GUI includes details of a subscription-based service plan associated with a third-party service provider. The routine also includes receiving data via the online site indicating a request from the consumer to activate a service corresponding to the subscription-based service plan. Further, the routine includes activating the service after the consumer has satisfied a pre-defined activation condition associated with the subscription-based service plan, wherein the service is to be provided to the consumer in a plurality of service increments during a subscription period.

DETAILED DESCRIPTION OF THE DRAWINGS

Referring to FIG. 1, a system to manage subscription-based services is illustrated and designated generally 100.

The system 100 includes a subscription service management system 102 that communicates with a third-party service provider subscription system 104 via a network 106, such as the Internet. In a particular embodiment, the third-party service provider subscription system 104 communicates with subscribers or prospective subscribers, such as the consumer 122, via a subscription fulfillment system 118. The third-party service provider subscription system 104 may also communicate with subscribers or prospective subscribers, such as the consumer 122, via one or more consumer interfaces 120.

The subscription service management system 102 is configured to communicate with consumer computing devices, such as the consumer computer 108, via the network 106. In addition, the subscription service management system 102 may be configured to communicate with a plurality of financial service providers 110 via one or more financial networks 112. The subscription service management system 102 may communicate with a third-party service provider financial account 116 via one or more of the financial networks 112. The financial network(s) 112 may include (without limitation) credit card networks, automated clearinghouse (ACH) networks, clearinghouse interbank payment system (CHIPS) networks, electronic bill presentment and payment (EBPP) networks, electronic funds transfer (EFT) networks, additional financial networks, or any combination thereof.

In the embodiment depicted in FIG. 1, the subscription service management system 102 is also configured to communicate with one or more security data systems 114. The security data system(s) 114 include one or more systems that store identification data, financial data, background data, other data, or any combination thereof, which can be accessed and used in conjunction with fraud check procedures and similar procedures to verify identities, reputations, other attributes, or any combination thereof, with respect to third-party service providers and consumers. In one embodiment, the subscription service management system 102 communicates with the security data system(s) 114 via one or more of the financial network(s) 112. Alternatively, the subscription service management system 102 communicates with the security data system(s) 114 via a private network or the network 106. As described in more detail below, the subscription service management system 102 may communicate with one or more security data systems 114 to confirm the authenticity of information provided by a potential consumer, a third party service provider, or any combination thereof.

The subscription service management system 102 is adapted to provide an online site that is accessible to consumers and third-party service providers via the network 106. For example, the online site is a website of a seller (wholesale or retail. As described further herein, the subscription service management system 102 is configured to receive requests from third-party service providers, requesting that the subscription service management system 102 manage one or more subscriptions to be fulfilled by the third-party service providers.

In response to receiving a request from a third party service provider, the subscription service management system 102 may determine whether the requesting third-party service provider is associated with a subscription management account or other account accessible to the subscription service management system 102. If the third-party service provider is not associated with such an account, the subscription service management system 102 prompts the third-party service provider to register with the subscription service management system 102 by providing identification data, information related to the third-party service provider financial account 116, other data or information, or any combination thereof.

In addition to establishing or identifying an account for a third party service provider, the subscription service management system 102 is adapted to receive configuration data from a third-party service provider that is necessary to establish a subscription-based service plan that may be selectively offered at the online site provided by the subscription service management system. The configuration data is received via a graphical user interface, application programming interface (API), other interfaces, or any combination thereof, which the service management system 102 provides via the network 106. As discussed herein, the configuration data includes details of a subscription-based service plan to be fulfilled by the third-party service provider during a subscription period. In one embodiment, a subscription-based service plan is fulfilled in a plurality of service increments, such as twelve monthly magazine issues, or in a single service increment, such as a shipping discount service that is renewable annually. In alternative embodiments, a subscription-based service plan may be fulfilled based upon a set number of items to be purchased, independent of time. For example, subscription-based service plan may be fulfilled upon purchase of five compact discs.

The subscription service management system 102 is adapted to receive configuration data related to a variety of subscription-based service plans. For example, subscription based-service plans offered by third-party service providers include, but are not limited to, a magazine service plan, a voice calling service plan, a digital video disc (DVD) rental service plan, a music downloading service plan, a television programming service plan, an insurance plan, or any combination thereof. As will be appreciated by one of skill in the art, any type of subscription-based service plan may be utilized with embodiments of the present invention.

As a further example, subscription based-service plans include a service plan tier, such as a bronze, silver, gold, or platinum membership, or a preferred or premium customer status; an additional service related to a subscription-based service plan, such as adding a digital video recorder service to a television programming service plan; a usage service option, such as text messaging; a recurring sub-subscription option, such as adding call waiting or other calling features to a voice calling service plan; a separate party sub-subscription option, such as adding a movie channel or a premium channel sports package to a television programming service; or any combination thereof. In a particular embodiment, the subscription service management system 102 receives configuration data related to multiple different types of subscription-based service plans from a single third-party service provider, from multiple third-party service providers, or any combination thereof.

The details of a subscription-based service plan that are received as part of the configuration data include, for example, a plan identifier, a plan title, a services description, a subscription period, a number of service increments during the subscription period, a time interval between service increments, or any combination thereof. Further, the details of the subscription-based service plan include a customized billing structure specified by the third-party service provider. The customized billing structure includes a number of billing increments, a time interval between billing increments, a payment amount associated with each billing increment, an indication of whether billing is to occur before or after each service increment, an indication of whether each billing increment is to relate to a current, past or future service increment, or any combination thereof.

The customized billing structure may also include a discount rule (e.g., 10% per year subscription purchased); a discount amount; a trial offer period (e.g., first two months); a trial offer service (e.g., first three magazine issues); a trial offer rule (e.g., must provide valid credit card); a service threshold after which billing is to begin (e.g., first 100 cell phone minutes free); one or more accepted payment types, an initial payment to activate the service corresponding to the subscription-based service plan, or any combination thereof.

In addition, the details of the subscription-based service plan may include a service provider cancellation rule, a subscriber cancellation rule, a shipping type, a shipping cost, a shipping restriction (e.g., domestic only), a valid shipping identification requirement (e.g., no P.O. boxes), a valid e-mail account requirement, a maximum number of subscriptions per customer, a date on which the subscription-based service plan is to be first offered at the online site, a date on which the subscription-based service plan is no longer to be offered at the online site or any combination thereof.

A subscription-based service plan may be an individual plan or may be associated with a family of subscription-based service plans offered by one or more third party service providers. The details corresponding to a family of subscription based service plans may include an available subscription upgrade from one plan to another, an available subscription downgrade from one plan to another, a subscription upgrade rule, a subscription downgrade rule, or any combination thereof. For instance, a shipping service for a family of preferred customer shipping plans offers a periodic fee to be charged to a subscriber based on a number of parcels shipped each year, such that the subscriber will receive discounted shipping rates during the time interval. In one example, if the subscriber ships one hundred parcels per year, the subscriber receives a 10% discount on all shipping costs charged by the carrier in return for a fee of $39.95 per year. On the other hand, if the subscriber ships one thousand parcels per year, the subscriber receives a 20% discount on all shipping costs charged by the carrier in return for a fee of $59.95 per year. If the number of parcels that the subscriber expects to ship changes, the subscriber has an option to upgrade or downgrade to a different subscription plan within the family of plans offered by the carrier.

In another embodiment, the details of a subscription-based service plan include a number of available concurrently-active subscription-based service plans. For example, a magazine service provider may desire to offer fifty available subscriptions to the same magazine under identical terms. Rather than configuring fifty separate subscriptions, the details of the subscription plan indicate that fifty concurrently-active subscriptions to the magazine are to be made available using the subscription-based service plan details provided by the third-party service provider. In addition, the details indicate a maximum number of the concurrently-active subscriptions available for purchase by a single subscriber, a maximum number of all subscriptions offered by the third-party service provider to all subscribers, a maximum number of all subscriptions offered by the third-party service provider that can be purchased by a single subscriber, or any combination thereof.

After configuration data related to a subscription-based service plan is received at the subscription service management system 102, the subscription-based service plan may be offered via the online site. For example, the third-party service provider is presented with an option to selectively offer or not offer the subscription-based service plan via the online site provided by the subscription service management system 102, and the third-party service provider sends data to the subscription service management system 102 indicating an election to offer or to not offer the subscription-based service plan via the online site. In one embodiment, the third-party service provider elects to add an identifier of the subscription-based service plan, or the service corresponding thereto, to a searchable catalogue of products, services, or any combination thereof, that is accessible via the online site.

To ensure, among other things, the security of potential customers and the integrity of the subscriptions services offered by the third party subscription service management system 102, the subscription service management system 102 performs one or more fraud check procedures prior to activating an account associated with the third-party service provider, prior to offering the subscription-based service plan via the online site, or any combination thereof. For example, the subscription service management system 102 may query the security data system(s) 114 for data indicating whether the third-party service provider, the subscription-based service plan, details of the subscription-based service plan, or any combination thereof, are known to be associated with fraudulent activity, or for data indicating whether identification data or financial account information received at the subscription service management system 102 is accurate with respect to the third-party service provider that is purportedly submitting the data (e.g., whether the party offering the subscription-based service plan is posing as a legitimate company). Further, the subscription service management system 102 may perform one or more screening procedures to ensure that the subscription-based service plan satisfies one or more policies, such as policies against offering adult content, illegal content, or perishable food items (e.g., fruit of the month).

As part of offering subscription-based services, the subscription service management system 102 receives requests from consumers such as the consumer 122 to receive a service corresponding to a subscription-based service plan via the online site. For example, the consumer 122 uses the consumer computer 108 to submit search criteria to a search engine provided at the online site, and search results are returned including identifiers of one or more subscription-based service plan(s) whose identifiers, details, or any combination thereof, match the search criteria. The consumer 122 selects an identifier of the subscription-based service plan from a list of search results, for instance, and the subscription service management system 102 provides for display a graphical user interface (GUI) to the consumer computer 108 that includes details of the subscription-based service plan. The subscription service management system 102 receives data from the consumer computer 108 indicating a request from the consumer 122 to activate the service associated with the subscription-based service plan. In one embodiment, the GUI includes a selectable indicator of an option to activate the service associated with the subscription-based service plan, such as a Subscribe Now indicator, a Sign-Up indicator, a Join Now indicator, or other indicator, and the subscription service management system 102 receives data indicating a selection of the indicator.

In response to the request, the subscription service management system 102 activates a service associated with the subscription-based service plan for a subscription period, during which the consumer 122 will receive the service from the third-party service provider according to the details of the subscription-based service plan. The subscription period may be selected by the consumer 122. For example, a consumer 122 may request during the month of March that a Book of the Month Club service be activated for the consumer 122 beginning in May. The details of the Book of the Month Club subscription-based service plan may indicate that the consumer 122 is to receive a new book each month for one year after the request. Thus, a subscription period extending from this May until the following May would be activated and associated with the consumer 122.

As part of activating a subscription service in response to a consumer request, the subscription service management system 102 may initially determine whether the consumer 122 is registered with the online site. If the consumer 122 is not registered with the online site, the subscription service management system 102 prompts the consumer 122 to create an account. The subscription service management system 102 receives identification data, financial account data, billing data, shipping data, other data, or any combination thereof, related to the consumer 122. The subscription service management system 102 may also perform one or more fraud check procedures to verify data received from the consumer computer 108 (e.g., by interacting with the security data system(s) 114) before activating an account associated with the consumer 122.

In another embodiment, the subscription service management system 102 determines whether the consumer 122 has satisfied a pre-defined activation condition associated with the subscription-based service plan before activating a subscription period selected by the consumer 122. For instance, the subscription-based service plan may require the consumer 122 to provide an initial payment or to provide valid credit card or address information, prior to activation of the service. The subscription service management system 102 activates the subscription period after it has determined that the consumer 122 has satisfied the activation condition and any fraud check procedures have been completed with respect to the consumer 122.

Upon activation of a subscription service, the subscription service management system 102 sends a notification to the third-party service provider subscription system 104 indicating that with the service has been activated with respect to the consumer 122 has been activated. Further, the subscription service management system 102 sends account information related to the consumer 122 to the third-party service provider subscription system 104 with the notification or with a subsequent notification. Such notifications may be sent to the third-party service provider in real-time; as logs indicating activations corresponding to a pre-defined time range; in response to a log retrieval command received from the third-party service provider; at predetermined intervals (e.g., nightly); or any combination thereof.

In an alternative embodiment, the third-party service provider elects to not offer the subscription-based service plan via the online site. Rather, the third-party service provider offers the subscription-based service plan via one or more of the consumer interfaces 120. Consumer interfaces 120 include, for example, an online site, a call center, an interactive voice response system, another consumer interface, or any combination thereof, that is made accessible to consumers by the third-party service provider. Still further, a third-party service provider may elect to offer a subscription-based service plan via both an online site provided by the third party service provider subscription system 104 and via a consumer interface 120.

In the instance that a subscription-based service plan is offered via a consumer interface 120, the third-party service provider subscription system 104 receives data from one or more of the consumer interfaces 120 indicating a request from the consumer 122 to receive the service corresponding to the subscription-based service plan. The third-party service provider subscription system 104 sends data indicating the request and a subscription period associated with the consumer 122 to the subscription service management system 102. The subscription service management system 102 activates the service during the subscription period in response to the data received from the third-party service provider. In another embodiment, the third-party service provider may offer the subscription-based service plan at a website of the third-party service provider, but the consumer request is received at the subscription service management system 102, for example, via a hyperlink that directs the consumer 122 from the third-party service provider website to the online site to request activation, make payment, and the like.

In a particular embodiment, a plurality of time-based trigger events occur during a subscription period associated with a consumer. For example, a subscription-based service offered by the third-party service provider is fulfilled in a plurality of time-based service increments, such as twelve monthly magazine issues. Each of the service increments represents a time-based trigger event corresponding to the consumer's subscription period. In another example, payment for a subscription-based service is collected in a plurality of billing increments, such as twelve monthly installments. Each of the billing increments represents a time-based trigger event corresponding to the consumer's subscription period.

The subscription service management system 102 is adapted to send at least one message related to a time-based trigger event to the third-party service provider during a subscription period associated with a consumer. The subscription service management system 102 can send such messages to the third-party service provider via e-mail, via simple object access protocol (SOAP) messaging, via other protocols or technologies that facilitate "pushing" messages to another party, or any combination thereof. Alternatively, the subscription service management system 102 can provide such messages in response to SOAP messages, API calls, or other communications received from the third-party service provider to pick up or otherwise "pull" messages from the subscription service management system 102.

In one embodiment, the subscription service management system 102 sends an e-mail or other communication to the third-party service provider via the third-party service provider subscription system 104 informing the third-party service provider that a time for a next service increment has been reached, will occur within a pre-defined time period or has passed. For example, the message may state a date, time, or any combination thereof, at which a service increment is to be provided to the consumer. In another illustrative embodiment, the subscription service management system 102 sends a message to the third-party service stating that a time for a next billing increment has been reached, will occur within a pre-defined time period, or has passed. The message includes, for example, a date, time, or any combination thereof, at which a next subscription payment is to be collected from the consumer.

The subscription service management system 102 may be adapted to send at least one message related to a time-based trigger event to the consumer computer 108 during a subscription period associated with the consumer 122. In an illustrative embodiment, the subscription service management system 102 sends an e-mail or other communication to the consumer computer 108 informing the consumer 122 that a time for a next service increment has been reached, will occur within a pre-defined time period or has passed. The message states, for instance, a date, time, or any combination thereof, at which a service increment is to be received by the consumer 122. In another embodiment, the subscription service management system 102 sends a message to the consumer computer 108 stating that a time for a next billing increment has been reached, will occur within a pre-defined time period, or has passed. The message includes, for example, a date, time, or any combination thereof, at which a next subscription payment is to be paid by the consumer.

Messages related to trigger events are sent by the subscription service management system 102 before a time-based trigger event, after the time-based trigger event, contemporaneously with the time-based trigger event, or any combination thereof. In a particular embodiment, the subscription service management system 102 places a plurality of service increment messages in a time-based queue, and each of the messages is automatically sent to third-party service providers before, contemporaneously with, or after the service increment to which the message relates. An example of a time-based queue is illustrated in FIG. 11. In one embodiment, the plurality of messages are placed in the time-based queue at the beginning of a subscription period associated with the consumer 122, and a pre-defined time or time interval is assigned to each message. The subscription service management system 102 tracks the subscription period over time, and each message is automatically sent when the assigned time occurs or the assigned time interval has expired. Messages related to billing increments and messages related to service increments are placed within a same time-based queue or within separate time-based queues at the subscription service management system 102. Messages to be sent to one or more third-party service providers and messages to be sent to one or more consumers may be placed within a same time-based queue or within separate time-based queues at the subscription service management system 102.

The subscription service management system 102 may be configured to receive subscription payments from consumers via the financial network(s) 112. For example, the consumer 122 designates a single payment instrument, such as a credit card, with which all subscription payments are to be paid within a subscription period. At a time associated with each billing increment, the subscription service management system 102 sends a request for a subscription payment to a credit card service provider corresponding to the consumer-designated credit card via one of the financial network(s) 112. In another example, the subscription service management system 102 sends a message requesting a subscription payment to the consumer computer 108 at a time associated with each billing increment of the subscription period. The consumer 122 provides data related to a payment instrument in response to each message, and the subscription service management system 102 requests payment from a financial service provider corresponding to the payment instrument.

Upon receiving a subscription payment from one of the financial service providers 110, the subscription service management system 102 is adapted to send at least a first portion of the subscription payment to the third-party service provider financial account 116Further, the subscription service management system 102 may be adapted to transfer a second portion, such as a transaction fee, service fee, or other amount, to another financial account, such as a financial account corresponding to a seller associated with the online site provided by the subscription service management system 102. In a particular embodiment, the subscription service management system 102 sends data to the third-party service provider, for example, via the third-party service provider subscription system 104, indicating that a portion of at least one subscription payment has been sent to the third-party service provider financial account 116.

The subscription service management system 102 may send notifications to third-party service provider systems, such as the third-party service provider subscription system 104 indicating changes to a subscription period associated with a consumer, changes to consumer account information (e.g., billing address, shipping address, financial instrument data), or any combination thereof. For example, the subscription service management system 102 receives data from the consumer computer 108 indicating a request to terminate a subscription. The subscription service management system 102 sends data to the third-party service provider subscription system 104 indicating the termination. Termination notifications may be sent to the third-party service provider in real-time; at the end of a pre-defined period (e.g., where a consumer cancels a pre-paid subscription plan, the termination notification could be held until the end of the period when the cancellation actually takes effect); as logs indicating all cancellations corresponding to a pre-defined time range; in response to a log retrieval command received from the third-party service provider; at predetermined time intervals (e.g., nightly); or any combination thereof.

Prior to terminating a subscription in response to a consumer request, the subscription service management system 102 determines whether the cancellation request meets one or more cancellation rules associated with the subscription-based service plan. In one embodiment, the subscription service management system 102 can provide a list of possible cancellation reasons and prompt a consumer to select one of the reasons from the list. Upon termination, the subscription service management system 102 can collect any fees associated with cancellation, cease messaging to the third-party service provider, the consumer 122, or any combination thereof, regarding service increments and billing increments, perform other cancellation procedures, or any combination thereof.

Metrics data indicating, for example, historical information related to activations, cancellations, etc., of subscription periods associated with different subscription-based service plans may be provided to third-party service providers by the subscription service management system 102. Such metric information may be limited to subscription-based service plans offered by a particular third party service provider, or may be information on all subscription-based service plans offered via the subscription service management system 102.

In one embodiment, the metrics are correlated in pairs by performing a cohort analysis. For example, the metrics can correlate subscription periods activated at a certain time of year with a number of such subscription periods that were cancelled before their expiration. In a particular embodiment, the subscription service management system 102 generates and sends recommendations for creating new subscriptions to the third-party service provider based on the metrics data. For instance, particular metrics may show that subscriptions to exercise magazines that are started in January are canceled at the end of an initial subscription period more often than those started in June. Based on these metrics, the subscription service management system 102 may provide a recommendation that the third-party service provider configure subscriptions offered to consumers in the month of January to include incentives for consumers to purchase such magazines with a longer subscription period (e.g., a 2-year term, instead of a 1-year term).

Figure 2:
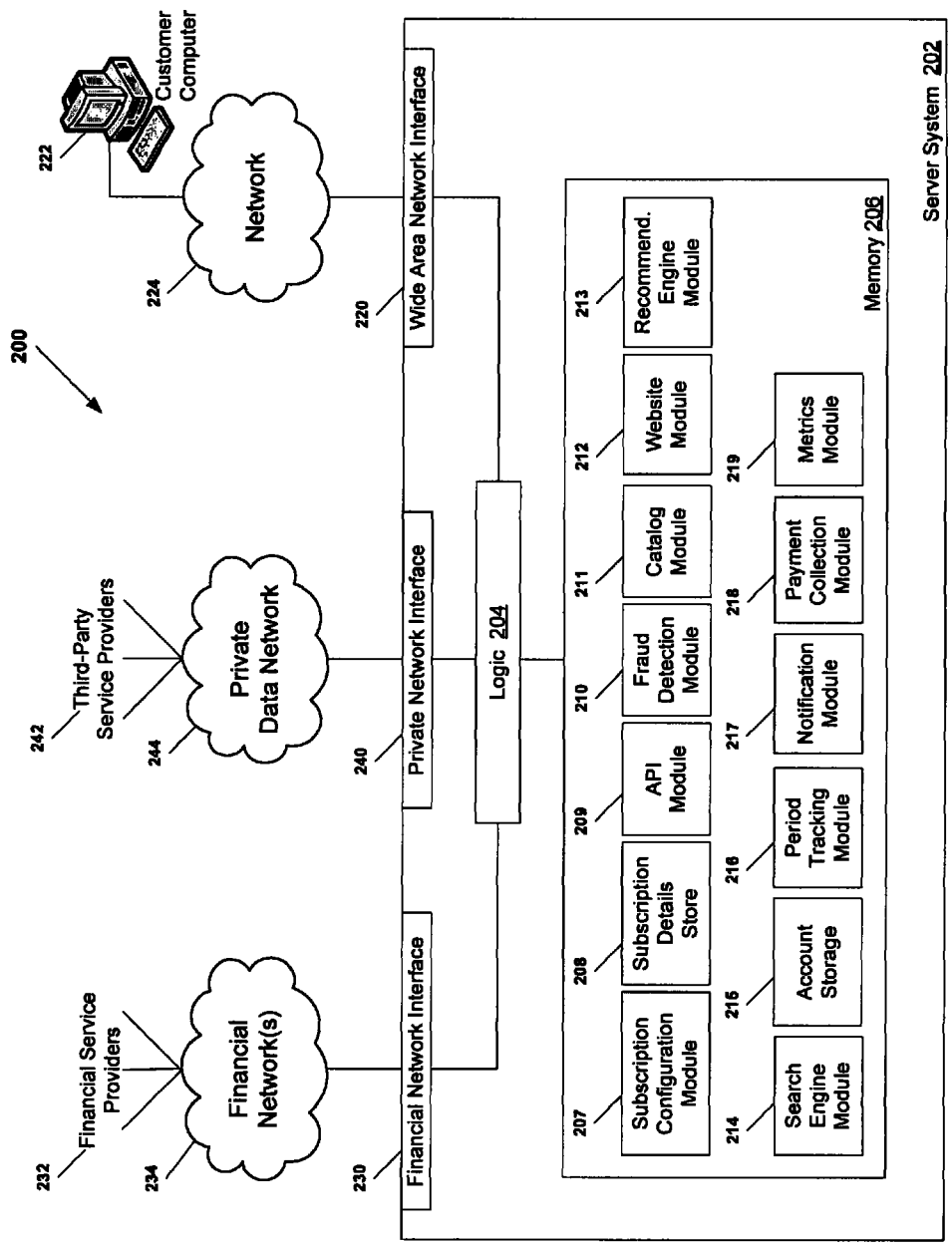
FIG. 2 is a block diagram of a second particular embodiment of a system to manage subscription-based services.

Referring to FIG. 2, a second particular embodiment of a system to manage subscription-based services is illustrated and designated generally 200. The system 200 includes a subscription service management server system 202 that communicates with consumer computing devices, such as the consumer computer 222, via the network 224, such as the Internet. In addition, the server system 202 communicates with a plurality of financial service providers 232 via one or more financial networks 234. Further, the server system 202 communicates with a plurality of third-party service provider subscription systems 242 via a private data network 244.

The server system 202 includes processing logic 204 and a memory 206 accessible to the processing logic. The server system 202 includes a single computer server or multiple computer servers that independently or redundantly include processing logic and memory to provide one or more functions associated with managing subscription-based services. In an illustrative embodiment, the server system 202 includes a network interface 220 that facilitates communication between the server system 202 and the network 224. In addition, the server system 202 includes a financial network interface 230 that facilitates communication between the server system 202 and the financial network(s) 234 and a private network interface 240 that facilitates communication between the server system 202 and the private data network 244.

In a particular embodiment, the memory 206 includes a plurality of computing components 207-219, each of which facilitates one or more functions of the server system 202 with respect to managing subscription-based services. The components 207-219 include processor-executable instructions. For instance, the components 207-219 include instructions that together comprise one or more software applications or other computer programs. In an alternative embodiment, one or more of the components 207-219 includes hardware logic adapted to perform one or more functions of the server system 202.

In a particular embodiment, the memory 206 includes a subscription configuration component 207 that is executable by the processing logic 204 to receive data from one of the third-party service providers 242 indicating a request to configure one or more subscriptions to be fulfilled by the third-party service provider and to be managed via the server system 202. In a particular embodiment, the subscription configuration component 207 may be configured such that the server system 202 receives configuration data from the third-party service provider via the private data network 244. The configuration data includes details of a subscription-based service plan to be fulfilled by the third-party service provider during a subscription period associated with a subscriber. Plan details and other configuration data is stored in association with a subscriber account, for instance, at a subscription details store 208.

The memory 206 may include an application programming interface (API) component 209 that is executable by the processing logic 204 to provide one or more APIs to the third-party service provider via the private data network 244, in response to a request to configure a subscription-based service plan. Each API is adapted to receive particular details or other configuration data related to the subscription-based service plan, such as the details and other configuration data described with reference to FIG. 1. An example of an API to receive configuration data is illustrated in FIGS. 10A and 10B.

The memory 206 may include a fraud detection component 210 that is executable by the processing logic 204 to perform one or more fraud check procedures with respect to the third-party service provider, the subscription-based service plan, the configuration, or any combination thereof, prior to establishing a third-party service provider account, prior to offering the subscription-based service plan via the online site, or any combination thereof. For example, the server system 202 may query the security data system(s) 114 depicted in FIG. 1 and receives data indicating whether the third-party service provider, the subscription-based service plan, details of the subscription-based service plan, or any combination thereof, are known to be associated with fraudulent activity, or for data indicating whether identification data or financial account information received at the server system 202 is accurate with respect to the third-party service provider.

The catalog component 211 may be configured to store a plan name or other identifier associated with the subscription-based service plan within a catalog of goods and services that are offered via a online site provided by the server system 202. The identifier is provided by the third-party service provider or assigned by the server system 202. Further, the catalog component 211 may be configured to store a service provider identifier, at least some details associated with the subscription-based service plan, or any combination thereof. The subscription configuration component 207 may be configured such that the server system 202 sends data to the third-party service provider presenting an option to selectively offer or not offer the subscription-based service plan via the online site, and information related to the subscription-based service plan can be stored at the catalog component 211 in response to data sent by the third-party service provider indicating an election to offer the subscription-based service plan via the online site. In an alternative embodiment, the catalog component 211 can be combined with the subscription configuration component 207 and can be configured to provide a subscription catalog that includes all plan configuration data and other data objects, such as plan names, provided by third-party service providers.

A website component 212 included in the memory 206 that is executable by the processing logic 204 can be configured such that the server system 202 provides an online site of a seller or other provider via the network 224. For example, a customer using the customer computer 222 accesses the online site via the network 224 using a web browser. In an illustrative embodiment, the online site displays offers of products, services, subscriptions, auctions, or any combination thereof, via one or more graphical user interfaces (GUIs).

The website component 212 is executable by the processing logic 204 to receive a request from the customer computer 222 via the online site to view information related to the subscription-based service plan. For instance, a consumer can view information related to a particular product or service at the online site via a GUI related to the product or service. The GUI includes a recommendation portion identifying additional recommended products and services, including the subscription-based service plan. The server system 202 receives data indicating a selection of an identifier of the subscription-based service plan and provides a GUI displaying information related to the subscription-based service plan. The memory 206 may include a recommendation engine component 213 that is executable by the processing logic 204 to access data related to products and services whose identifiers are stored at the catalog component 211 and to determine recommended products, services, or any combination thereof, to provide for display in a recommendation portion of a GUI related to another product or service.

The memory 206 includes a search engine component 214 that is executable by the processing logic 204 and configured such that the server system 202 may receive search criteria via the online site and identify products, services, or any combination thereof, matching the search criteria by accessing data stored at the catalog component 211. For instance, a consumer uses the consumer computer 222 to submit search criteria to a search engine provided via the online site, and an identifier of the subscription-based service plan is returned with search results that match the search criteria. The consumer 222 selects an identifier of the subscription-based service plan from the search results, and the server system 202 provides a graphical user interface (GUI) to the consumer computer 222 that includes information related to the subscription-based service plan.

The website component 212 is executable by the processing logic 204 and configured to receive data from the consumer computer 222 indicating a request to activate a service corresponding to the subscription-based service plan. For example, the GUI includes a selectable indicator of an option to activate the service associated with the subscription-based service plan, such as a Subscribe Now indicator, a Join Now indicator, or other indicator, and the subscription service management system 202 receives data indicating a selection of the indicator.

The website component 212 may be configured such that the server system 202 determines whether the consumer has an account by accessing an account storage 215 that stores general information related to consumer accounts with the online site operator, such as names, addresses, account identifiers, payment information, account status, and other account information. The website component 212 may be executable by the processing logic 204 to prompt the consumer to create an account in response to the consumer request to activate the service, if the consumer does not have an account with the seller or other provider. In one embodiment, the fraud detection component 210 may be configured such that the server system 202 performs one or more fraud check procedures with respect to the consumer prior to activating an account. In another embodiment, the fraud detection component 210 is executable by the processing logic 204 to perform one or more fraud check procedures with respect to the consumer prior to signing a consumer up for a subscription-based service plan, prior to activating a subscription period associated with the consumer, prior to the beginning of each new subscription period associated with the consumer, or any combination thereof.

The memory 206 also includes a period tracking component 216 that is executable by the processing logic 204 to activate a subscription period associated with the consumer, during which the consumer is to receive the service from the third-party service provider. Further, the period tracking component 216 is configured such that the server system 202 tracks the subscription period over time and to track time-based trigger events related to the subscription period. For example, a subscription-based service offered by the third-party service provider is fulfilled in a single service increment, such as a shipping discount service that is renewable annually. A renewal date represents a time-based trigger event corresponding to the consumer's subscription period, and the period tracking component 216 is executable by the processing logic 204 to determine a date, time, or any combination thereof, at which an action corresponding to the renewal date is to be performed. In another example, payment for a subscription-based service is collected in single billing increments, such as an annual renewal payment. The annual renewal payment date represents a time-based trigger event corresponding to the consumer's subscription period, and the period tracking component 216 is executable by the processing logic 204 to determine a date, time, or any combination thereof, at which the annual renewal payment is to be collected.

The memory 206 includes a notification component 217 that is executable by the processing logic 204 and which may be configured such that the server system 202 sends a notification to the third-party service provider subscription system 204 indicating that a subscription period associated with the consumer has been activated. In one embodiment, such a notification includes account information related to the consumer 222. The notification component 217 is executable by the processing logic 204 to send activation notifications to the third-party service provider in real-time (i.e., as subscription periods are activated with respect to individual consumers). In another embodiment, activation notifications are sent as logs indicating all activations corresponding to a pre-defined time range. In still another embodiment, activation notifications are sent in response to a notification log retrieval command received from the third-party service provider. Notification preferences are received as part of configuration data related to a subscription-based service plan, and the notification component 217 is executable by the processing logic 204 to send or provide activation notifications to the third-party service provider according to the preferences.

Further, the notification component 217 may be configured such that the server system 202 sends at least one message related to a time-based trigger event to the third-party service provider during a subscription period associated with a consumer. For example, the notification component 217 is executable by the processing logic 204 to send an e-mail to the third-party service provider regarding a time for a next service increment, a time for a next billing increment, or any combination thereof. The notification component 217 may also be configured such that the server system 202 sends at least one message related to a time-based trigger event to the consumer computer 222 during a subscription period associated with the consumer. For instance, the notification component 217 is executable by the processing logic 204 to send an e-mail to the third-party service provider regarding a time for a next service increment, a time for a next billing increment, or any combination thereof.

The notification component 217 may be further configured such that the server system 202 sends messages related to trigger events before a trigger event, after the trigger event occurs, contemporaneously with the occurrence of the trigger event, or any combination thereof. For example, the notification component 217 may be executable by the processing logic 204 to place a plurality of service increment messages in one or more time-based queues when a subscription period is activated, and each of the messages is automatically sent before, contemporaneously with, or after the time-based trigger event to which the message relates. An example of a time-based queue is illustrated in FIG. 11.

The notification component 217 may also be configured such that the server system 202 sends notifications to the third-party service provider indicating changes to a subscription period associated with a consumer, changes to consumer account information (e.g., billing address, shipping address, financial instrument data), or any combination thereof. Termination notifications may be sent to the third-party service provider in real-time; as logs indicating cancellations corresponding to a pre-defined time range; in response to a log retrieval command received from the third-party service provider; at predetermined time intervals (e.g., nightly); or any combination thereof.

The notification component 217 is executable by the processing logic 204 and is configured to send notification messages via e-mail, via simple object access protocol (SOAP) messaging, via other protocols or technologies that facilitate "pushing" messages to the third-party service provider or consumer, or any combination thereof. Alternatively, the notification component 217 can be executable by the processing logic 204 and can be configured to provide such messages in response to SOAP messages, API calls, e-mails, or other communications received from the third-party service provider or consumer to pick up or otherwise "pull" messages from the server system 202.

The memory 206 further includes a payment collection component 218 that is executable by the processing logic 204 and configured such that the server system 202 receives subscription payments from consumers via the financial network(s) 234. In an illustrative embodiment, the consumer designates a single payment instrument, such as a credit card, with which all subscription payments are to be paid within a subscription period. At a time associated with each billing increment, the payment collection component 218 is executable by the processing logic 204 to send a request for a subscription payment to a credit card service provider corresponding to the consumer-designate credit card via one of the financial network(s) 212. In another example, the payment collection component 218 is executable by the processing logic 204 to send a message requesting a subscription payment to the consumer computer 222 at a time associated with each billing increment of the subscription period. The consumer provides data related to a payment instrument in response to each message, and the payment collection component 218 is executable by the processing logic 204 to request payment from a financial service provider corresponding to the payment instrument.

Upon receiving a subscription payment from one of the financial service providers 232, the payment collection component 218 is executable by the processing logic 204 to send at least a first portion of the subscription payment to a financial account of the third-party service provider providing the subscription-based service plan to which the payment relates. The payment collection component 218 may also be configured such that the server system 202 transfers a second portion, such as a transaction fee, service fee, or other amount, to another financial account, such as a financial account corresponding to the seller or other provider associated with the online site. The payment collection component 218 may be configured such that the server system 202 sends data to the third-party service provider indicating that the subscription payment was received and that a portion of at least one subscription payment has been sent to the third-party service provider financial account.

The memory 206 may also include a metrics component 219 that is executable by the processing logic 204 to provide metrics data to the third-party service provider. The metrics data indicates, for example, historical information related to activations, cancellations, or any combination thereof, of subscription periods associated with each of the different subscription-based service plans offered by the third-party service provider and managed via the server system 202. In one embodiment, the metrics are correlated in pairs by performing a cohort analysis. In a particular embodiment, the server system 202 generates and sends recommendations to the third-party service provider for creating new subscription-based service plans based on the metrics data.

Figure 3:
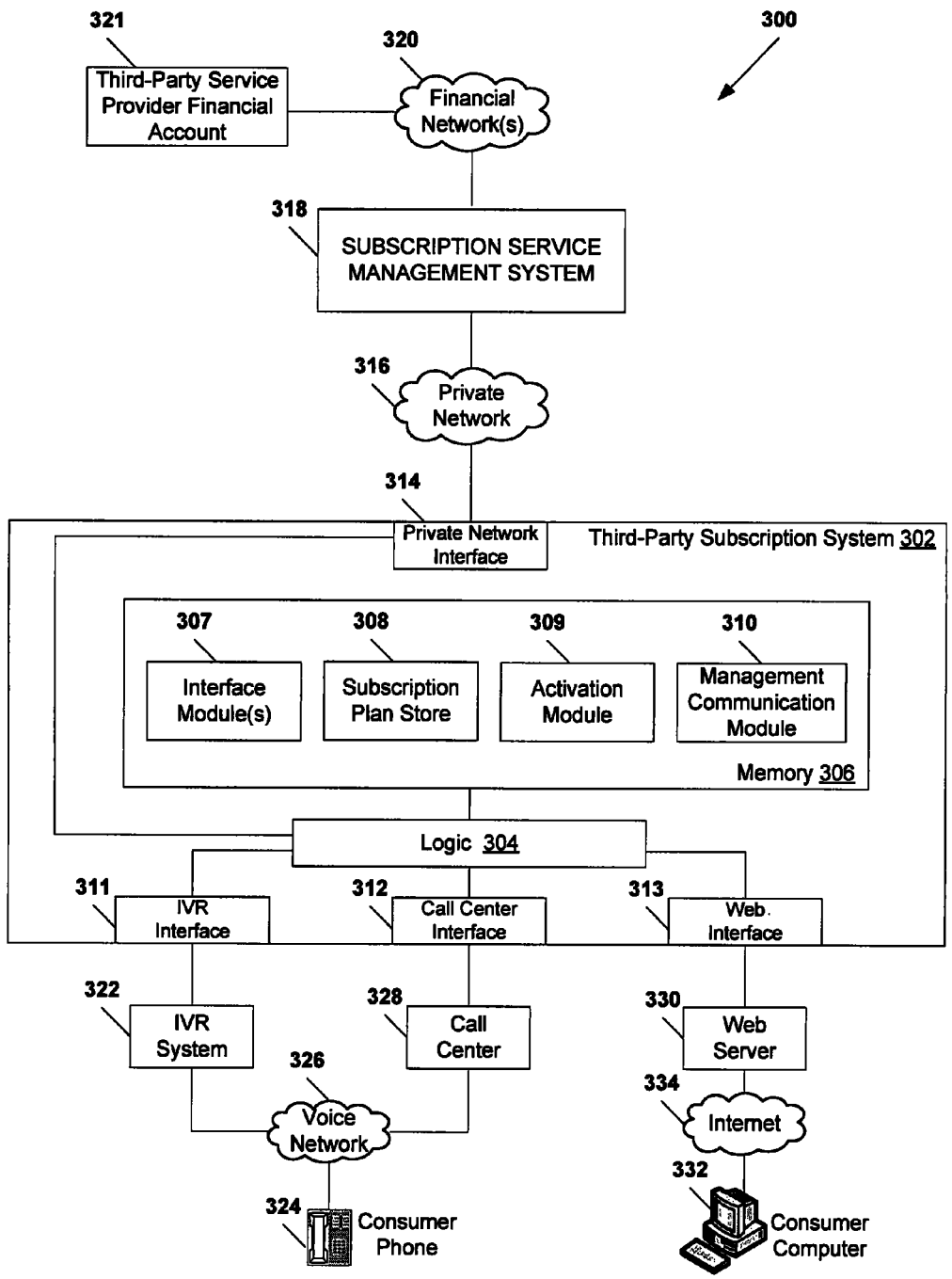
FIG. 3 is a block diagram of a third particular embodiment of a system to manage subscription-based services

Referring to FIG. 3, a third particular embodiment of a system to manage subscription-based services is illustrated and designated generally 300. The system 300 includes a third-party service provider subscription system 302 that is adapted to communicate with a subscription service management system 318 via a private network 316. In a particular embodiment, the subscription service management system 318 communicates with a third-party service provider financial account 321 via one or more financial networks 320.

The third-party service provider subscription system 302 includes processing logic 304 and memory 306 that is accessible to the processing logic 304. In a particular embodiment, the third-party service provider subscription system 302 includes a private network interface 314 that facilitates communication between the third-party service provider subscription system 302 and the private network 316. Alternatively, a virtual private network (VPN) interface or an Internet interface having an encrypted connection may be used to facilitate network communication between the third-party service provider subscription system 302 and the subscription service management system 318. The third-party service provider subscription system 302 also includes a plurality of consumer interfaces 311-313 that facilitate communication between the third-party service provider subscription system 302 and one or more systems adapted to receive communications from consumers.

For example, the third-party service provider subscription system 302 includes an interactive voice response (IVR) interface 311 that can be coupled to an IVR system 322. A consumer can use a consumer phone 324 to communicate with the IVR system 322 via a voice network 326. Further, the third-party service provider subscription system 302 includes a call center interface 312 that can be coupled to a call center 328. A consumer can use the consumer phone 324 to communicate with an agent at the call center 328 via the voice network 326. In addition, the third-party service provider subscription system 302 includes a web interface 313 that can be coupled to a web server 330. A consumer can use a consumer computer 332 to communicate with a third-party service provider website provided by the web server 330 via the Internet 334.

The memory 306 of the third-party subscription system includes a plurality of components 307-310, each of which can facilitate one or more functions of the server system 302 with respect to managing subscription-based services. In a particular embodiment, the components 307-310 include processor-executable instructions. The components 307-310 include, for example, instructions that together comprise one or more software applications or other computer programs. In an alternative embodiment, one or more of the components 307-310 includes hardware logic adapted to perform one or more functions of the third-party subscription system 302.

In a particular embodiment, the memory 306 includes one or more interface components 307 that are executable by the processing logic 304 to receive data via the consumer interfaces 311-313. The interface component(s) 307 are executable by the processing logic 304 to communicate information related to one or more subscription-based service plans and to receive requests from consumers to activate one or more services associated with one or more subscription-based service plans offered by the third-party service provider. Data related to the subscription-based service plan(s) may be stored at a subscription plan store 308.

The memory 306 may include an activation component 309 that is executable by the processing logic 304 and configured such that the third-party subscription system 302 activates services related to the subscription-based service plan(s) offered by the third-party service provider in response to the consumer requests. As discussed above, activation of a service includes establishing a consumer account, starting a subscription period, collecting consumer billing and delivery information (physical or electronic), other activation procedures, or any combination thereof.

The memory 306 may include a management communication component 310 that is executable by the processing logic 304 and configured such that the third-party subscription system 302 sends and receives data with the subscription service management system 318. For example, the management communication component 310 is executable by the processing logic 304 to communicate identification data and financial account data related to the third-party service provider to the subscription service management system 318. Additionally, the management communication component 310 is executable by the processing logic 304 to retrieve details of a subscription-based service plan to be managed via the subscription service management system 318 from the subscription plan store 308 and to communicate the details to the subscription service management system 318.

The management communication component 310 may be configured such that the third-party subscription system 302 receives data from the subscription service management system 318 indicating an option to selectively offer or not offer the subscription-based service plan via an online site provided by the subscription service management system 318. For example, the management communication component 310 may be configured such that the third-party subscription system 302 sends data to the subscription service management system 318 indicating a selection to make the subscription-based service plan accessible to consumers via the online site.

In another embodiment, the third-party service provider has an option to elect to not offer the subscription-based service plan via the online site, and the management communication component 310 is executable by the processing logic 304 to send data to the subscription service management system 318 indicating a selection to not make the subscription-based service plan accessible to consumers via the online site. Rather, the third-party service provider offers the subscription-based service plan via one or more of the consumer interfaces 311-313.

The third-party service provider subscription system 302 receives data from one or more of the consumer interfaces 311-313 indicating a request from a consumer to receive a service corresponding to a subscription-based service plan. The management communication component 310 may be configured such that the third-party subscription system 302 sends data indicating the request and a subscription period associated with the consumer to the subscription service management system 318. The subscription service management system 318 activates a subscription period associated with the consumer. In a particular embodiment, the management communication component 310 is executable by the processing logic 304 to receive one or more notifications or messages from the subscription service management system during the subscription period.

Figure 4:
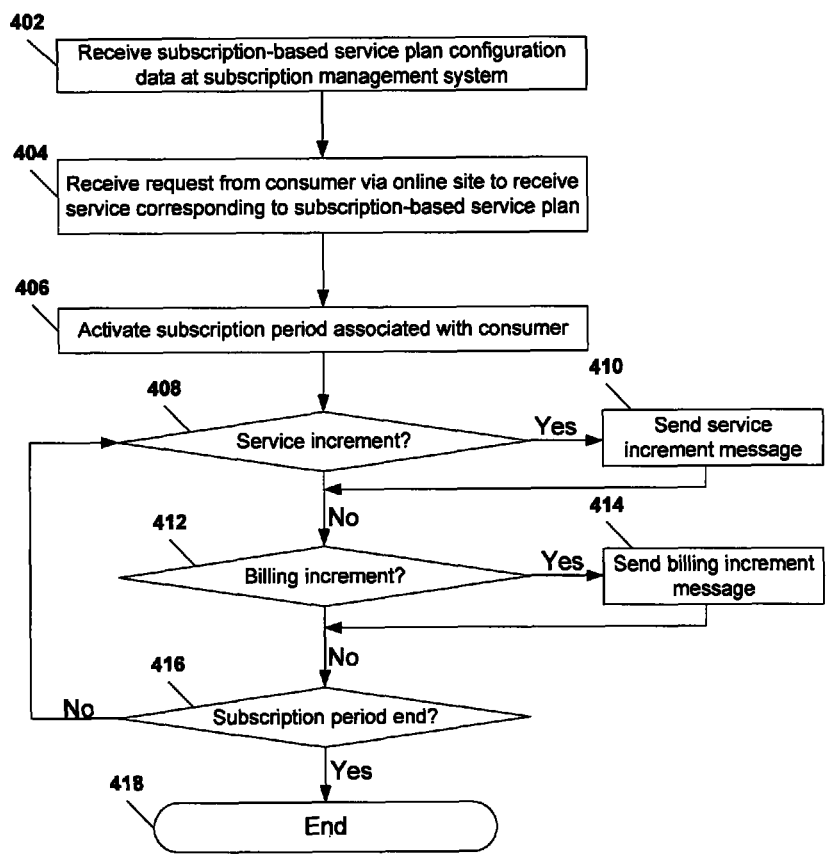
FIG. 4 is a flow diagram of a particular embodiment of a routine for managing subscription-based services.

Referring to FIG. 4, a particular embodiment of a routine for managing subscription services is illustrated. At block 402, a subscription service management system receives subscription plan configuration data. The configuration data includes details of a subscription-based service plan of a third-party service provider. As discussed above, the subscription-based service plan is offered via an online site.

Moving to block 404, the subscription service management system receives a request from a consumer to receive a service corresponding to the subscription-based service plan available via the online site, which may be an electronic commerce site. In another embodiment, the request can be received from the consumer via a web service application programming interface (API) originating from within a desktop application that is connected to the Internet (e.g., Quicken). Proceeding to block 406, the subscription service management system activates the service with respect to the consumer, where the consumer receives the subscription-based service during a subscription period that may be selected by the consumer. In a particular embodiment, the third-party service provider fulfills the service requested by the consumer during the subscription period in one or more service increments. Continuing to decision block 408, the subscription service management system determines whether a date, time, or any combination thereof, related to a service increment has been reached. If the subscription service management system determines, for example, that a date, time or any combination thereof, related to the service increment has not been reached, the routine advances to decision block 412. Conversely, if the subscription service management system determines that the date related to the service increment has been reached the routine proceeds to block 410, and a service increment message is sent to the third-party service provider informing the third-party service provider that the date at which the service increment is to be provided to the consumer has been reached. The routine then moves to decision block 412.

At decision block 412, the subscription service management system determines whether a date, time, or any combination thereof, related to a billing increment has been reached. If the subscription service management system determines, for example, that a date, time, or any combination thereof, related to the billing increment has not been reached, the routine advances to decision block 416. Conversely, if the subscription service management system determines that the date and time have been reached the routine proceeds to block 414, and a billing increment message is sent to the third-party service provider informing the third-party service provider that a date and time at which a subscription payment is to be collected from the consumer has been reached. The routine then moves to decision block 416.

In alternative embodiments, service increment messages, billing increment messages, or any combination thereof, are sent within a pre-defined period before or after the date, time, or any combination thereof, at which service increments or billing increments are to occur or have occurred. For example, billing increment messages may be sent to a third-party service provider a fixed period of time (e.g., five days) in advance of the date and/or time increment has been reached.

Proceeding to decision block 416, the subscription service management system determines whether the subscription period associated with the consumer has ended. If the subscription service management system determines that the subscription period has not ended, the routine returns to decision block 408 and continues. On the other hand, if the subscription service management system determines that the subscription period has ended, the routine terminates, as illustrated by block 418.

Figure 5:
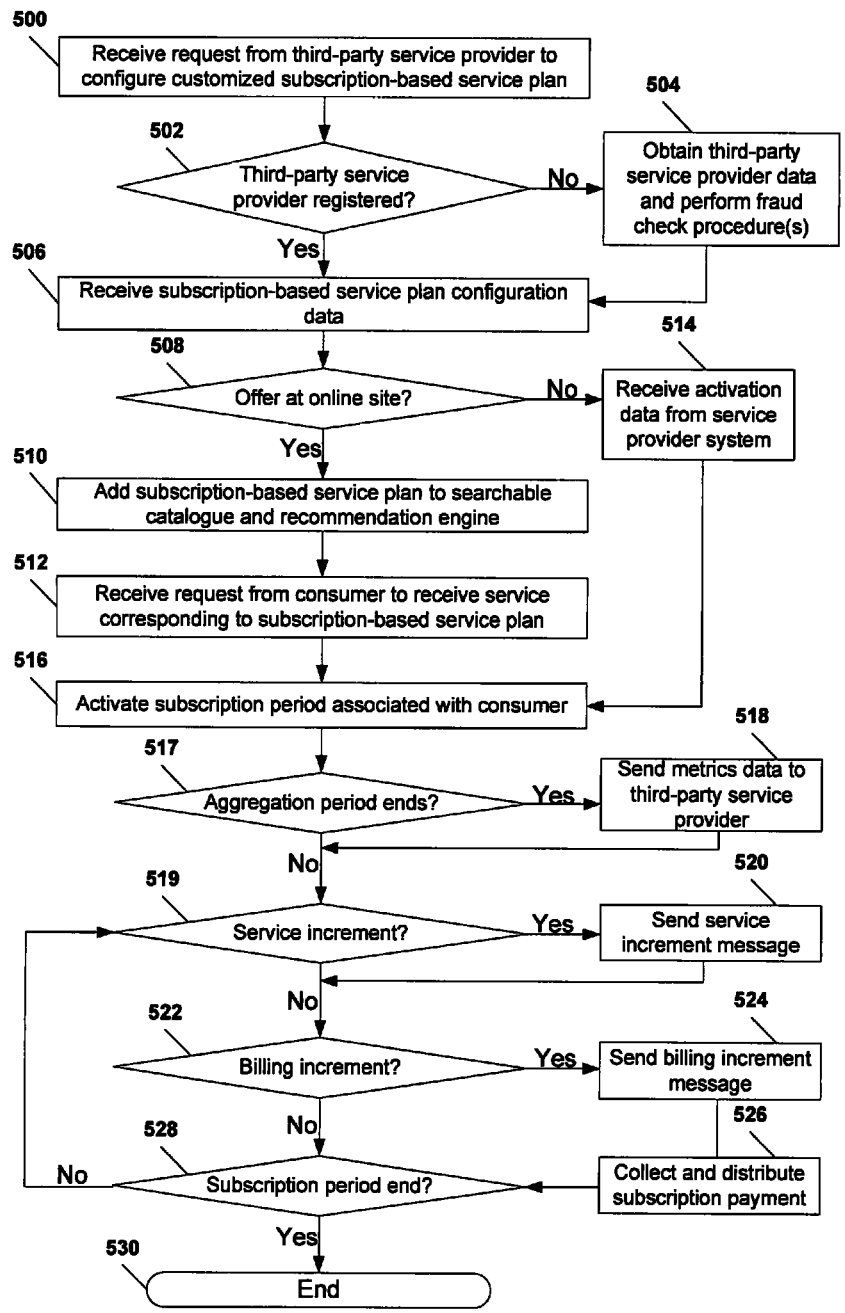
FIG. 5 is a flow diagram of a second particular embodiment of a routine for managing subscription-based services.

Referring to FIG. 5, a second particular embodiment of a routine for managing subscription services is illustrated. At block 500, a subscription service management system receives a request from a third-party service provider to configure a customized subscription-based service plan. Moving to decision block 502, in a particular embodiment, the subscription service management system determines whether the third-party service provider is registered with the subscription service management system. If the subscription service management system determines that the third-party service is registered, the routine advances to block 506. Whereas, if the subscription service management system determines that the third-party service provider is not registered with the subscription service management system, the routine proceeds to block 504, and the subscription service management system obtains identification data and financial account data from the third-party service provider. In one embodiment, the subscription service management system performs one or more fraud check procedures with respect to the third-party service provider after receiving the data.

At block 506, the subscription service management system receives subscription plan configuration data from the third-party service provider. Moving to decision block 508, the subscription service management system determines whether the subscription-based service plan is to be offered via an online site to which the subscription service management system is accessible. For example, the subscription service management system prompts the third-party service provider to indicate selection of an option to offer the subscription-based services plan via the online site or to not offer the subscription-based services plan via the online site.

If it is determined at decision block 508 that the subscription-based service plan is to be offered via the online site, at block 510, the subscription service management system may add an identifier, configuration data, or any combination thereof, associated with the subscription-based service plan to a searchable catalogue and recommendation engine associated with the online site. Advancing to block 512, the subscription service management system receives a request to receive a service corresponding to the subscription-based service plan from a consumer via the online site. The routine then moves to block 516.

Returning to decision block 508, if the subscription service management system determines that the subscription-based service plan is not to be offered via the online site, the routine proceeds to block 514. For example, the third-party service offers the subscription-based service plan via a third-party service provider website or other consumer interface. At block 514, the subscription service management system receives data from a third-party service provider system indicating a consumer request to activate a service corresponding to the subscription-based service plan. The data includes information related to the consumer, such as account information and a subscription period determined for the consumer by the third-party service provider system. The routine then moves to block 516.

Moving to block 516, the subscription service management system activates a subscription period associated with the consumer. In a particular embodiment, the third-party service provider fulfills the service requested by the consumer during the subscription period in one or more service increments. Continuing to decision block 517, the subscription service management system determines whether an aggregation period ends. If an aggregation period has ended, the routine proceeds to block 518, and the subscription service management system sends metrics data the third-party service provider. As discussed herein, the metrics data can include correlated historical data related to activations, cancellations, and other aspects of subscription-based service plans offered by the third-party service provider.

Advancing to decision block 519, the subscription service management system determines whether a date, time, or any combination thereof, related to a service increment has been reached. If the subscription service management system determines, for example, that a date related to the service increment has not been reached, the routine advances to decision block 522. Conversely, if the subscription service management system determines that the date related to the service increment has been reached the routine proceeds to block 520, and the subscription service management system sends a service increment message to the third-party service provider informing the third-party service provider that the date at which the service increment is to be provided to the consumer has been reached. The routine then moves to decision block 522.

At decision block 522, the subscription service management system determines whether a date, time, or any combination thereof, related to a billing increment has been reached. If the subscription service management system determines, for example, that a date and time related to the billing increment have not been reached, the routine advances to decision block 528. Conversely, if the subscription service management system determines that the date and time have been reached, the routine proceeds to block 524, and the subscription service management system sends a billing increment message to the third-party service provider informing the third-party service provider that a date and time at which a subscription payment is to be collected from the consumer has been reached. At block 526, the subscription service management system receives a subscription payment and distributes portions of the subscription payment among various accounts, such as a third-party service provider account and a retailer account. The routine then moves to decision block 528.

Proceeding to decision block 528, the subscription service management system determines whether the subscription period associated with the consumer has ended. If the subscription service management system determines that the subscription period has not ended, the routine returns to decision block 519 and continues. On the other hand, if the subscription service management system determines that the subscription period has ended, the routine terminates at 530.

Figure 6:
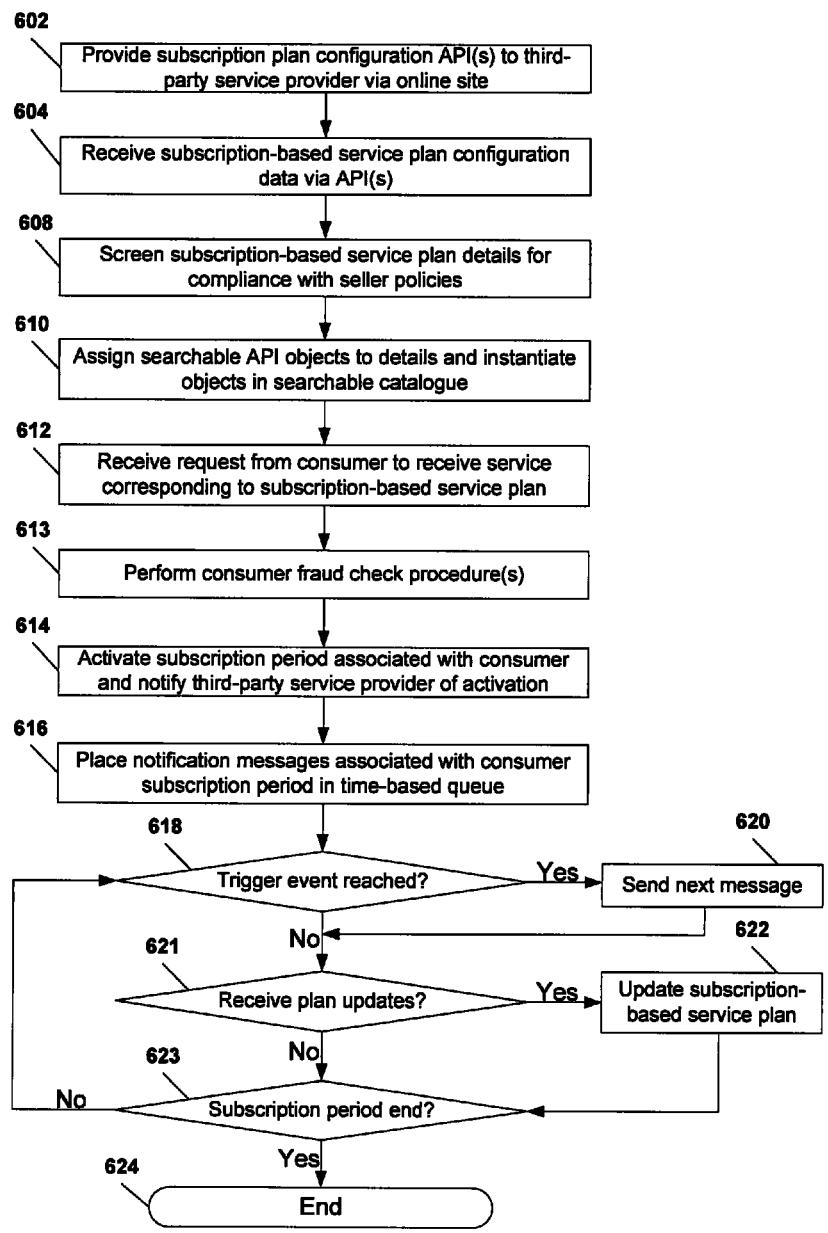
FIG. 6 is a flow diagram of a third particular embodiment of a routine for managing subscription-based services.

Referring to FIG. 6, a third particular embodiment of a routine for managing subscription services is illustrated. At block 602, a subscription service management system provides a plurality of application programming interfaces (APIs) to a third-party service provider via an online site. Moving to block 604, the subscription service management system receives configuration data that includes details of a subscription-based service plan via the APIs. At block 608, the subscription service management system screens the subscription plan details for compliance with particular policies, such as whether the subject matter of the subscription-based service plan includes adult content, illegal content, perishable food items, or other subject matter prohibited by the policies.

Continuing to block 610, the subscription service management system assigns searchable API objects to one or more of the details of the subscription-based service plan and can instantiate the API objects in a catalogue that is searchable via the online site. Moving to block 612, the subscription service management system receives a request from a consumer via the online site to receive a service corresponding to the subscription-based service plan. Advancing to block 613, the subscription service management system performs one or more fraud check procedures to verify the identity of the consumer and information provided by the consumer. Proceeding to block 614, the subscription service management system activates a service associated with the subscription-based service plan for a subscription period associated with the consumer and can notify the third-party service provider of the activation. Such notification includes information related to the consumer.

Advancing to block 616, in an illustrative embodiment, the subscription service management system places a plurality of notification messages in a time-based queue stored at the subscription service management system. The notification messages relates to one or more service increments, one or more billing increments, or any combination thereof. Further, the notification messages can be targeted to the third-party service provider, the consumer, or any combination thereof.

In another embodiment, the notification messages are placed in a plurality of time-based queues stored at the subscription service management system.

At decision block 618, the subscription service management system determines whether a time-based trigger event related to the subscription period associated with the consumer has been reached. A time-based trigger event includes, for example, a pre-defined time prior to, after, or concurrent with a date or time corresponding to a service increment or billing increment. If the subscription service management system determines that a time-based trigger event has not been reached, the routine continues to decision block 621. On the other hand, if the subscription service management system determines that a time-based trigger event has been reached, the routine proceeds to block 620, and a next message in the time-based queue is automatically sent. The routine then proceeds to decision block 621.

Proceeding to decision block 621, the subscription service management system determines whether it has received updates to the subscription-based service plan. If updates are not received, the routine proceeds to decision block 623. Whereas, if updates are received, the routine moves to block 622, and the subscription service management system updates the subscription-based service plan offered via the online site. Services activated with respect to consumers may also be altered to reflect the updates.

At decision block 623, the subscription service management system determines whether the subscription period associated with the consumer has ended. If the subscription service management system determines that the subscription period has not ended, the routine can return to decision block 618 and continue. On the other hand, if the subscription service management system determines that the subscription period has ended, the routine terminates at 624.

Figure 7:
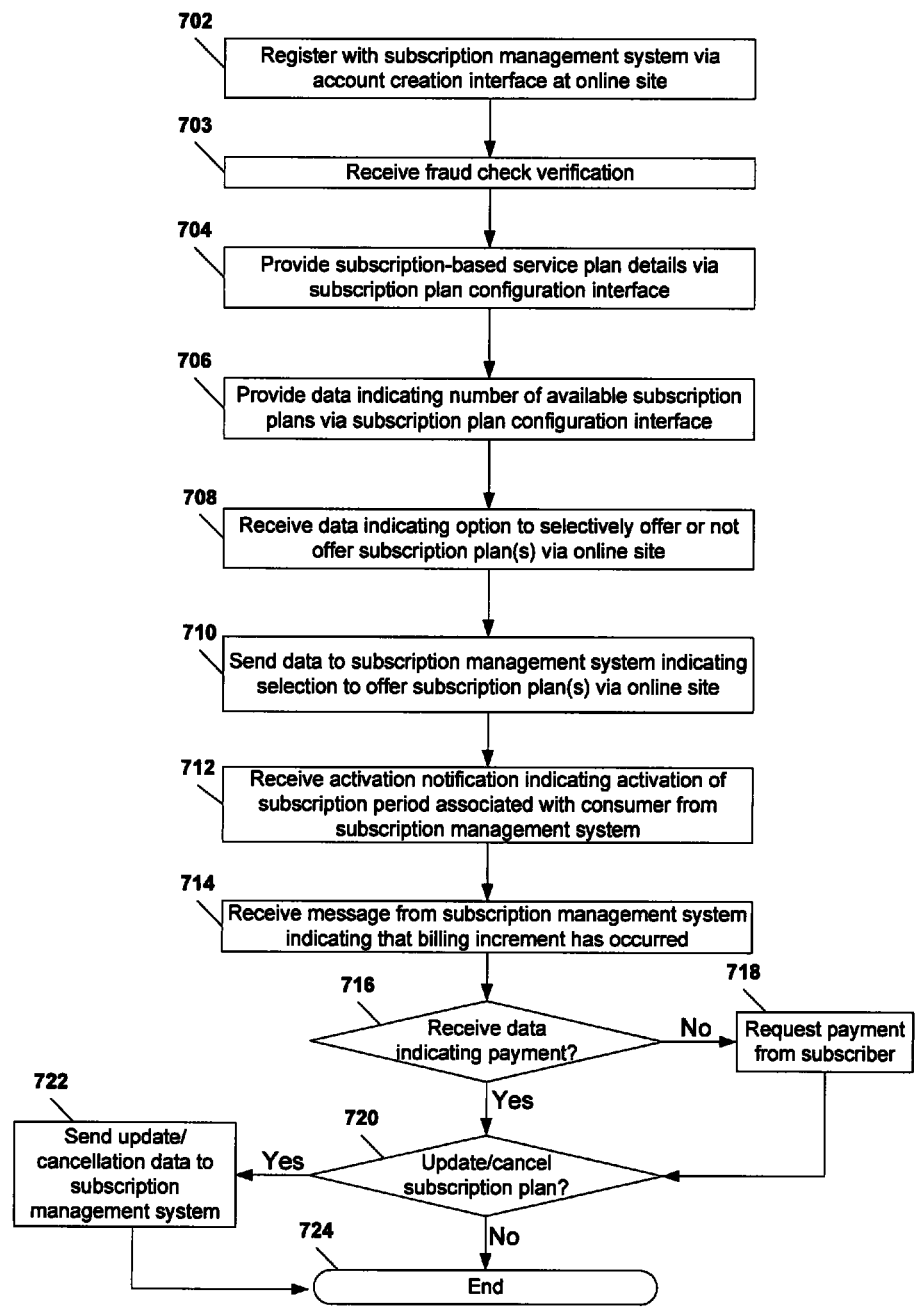
FIG. 7 is a flow diagram of a fourth particular embodiment of a routine for managing subscription-based services.

Referring to FIG. 7, a fourth particular embodiment of a routine for managing subscription services is illustrated. At block 702, a third-party service provider registers with a subscription service management system via an account creation interface at an online electronic commerce (e-commerce) site. Moving to block 703, the third-party service provider receives confirmation that information provided by the third-party service provider during registration has been verified via one or more fraud check procedures. At block 704, the third-party service provider provides details of a subscription-based service plan to the subscription service management system via a subscription plan configuration interface at the e-commerce site. In an illustrative embodiment, the routine proceeds to block 706, and the third-party service provider interacts with the subscription plan configuration interface to indicate a number of concurrently-available subscription plans having the submitted details that are to be offered via the e-commerce site.

Continuing to block 708, the third-party service provider receives data indicating an option to selectively offer or not offer the subscription plan(s) via the e-commerce site. In a particular embodiment, the routine advances to block 710, and the third-party service provider sends data to the subscription service management system indicating a selection to offer the subscription plan(s) via the e-commerce site.

At block 712, the subscription service management system receives an activation notification indicating that a subscription period associated with a consumer has been activated by the subscription service management system. Moving to block 714, the third-party service provider receives a message from the subscription service management system indicating that a billing increment related to the subscription period has occurred. Proceeding to decision block 716, the third-party service provider determines whether data received from the subscription service management system indicates that the consumer has remitted a subscription payment. If the third-party service provider determines that such data has been received, the routine continues to decision block 720. Conversely, if the third-party service provider determines that data indicating that the consumer has remitted the subscription payment has been received, the routine advances to block 718, and the third-party service provider requests the subscription payment from the consumer or request that the consumer remit the subscription payment to the subscription service management system via the e-commerce site. The routine then moves to decision block 720.

At decision block 720, the third-party service provider determines whether to cancel or update the subscription plan(s) offered via the e-commerce site. If the third-party service provider determines to cancel or update the subscription plans(s), the routine proceeds to block 722, and the third-party service provider sends update or cancellation data to the subscription service management system. The routine terminates at 724.

Figure 8:
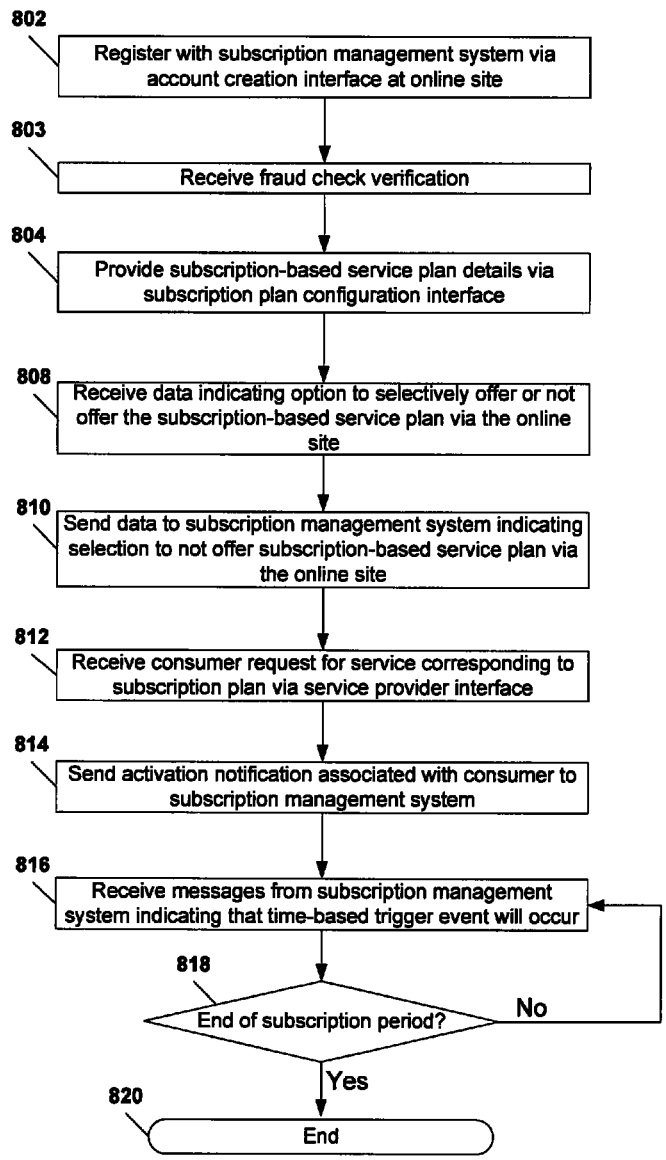
FIG. 8 is a flow diagram of a fifth particular embodiment of a routine for managing subscription-based services.

Referring to FIG. 8, a fifth particular embodiment of a routine for managing subscription services is illustrated. At block 802, a third-party service provider registers with a subscription service management system via an account creation interface at an online electronic commerce (e-commerce) site. Moving to block 803, the third-party service provider receives confirmation that information provided by the third-party service provider during registration has been verified via one or more fraud check procedures. At block 804, the third-party service provider provides details of a subscription-based service plan to the subscription service management system via a subscription plan configuration interface at the e-commerce site. Continuing to block 808, the third-party service provider receives data indicating an option to selectively offer or not offer the subscription plan(s) via the e-commerce site. In a particular embodiment, the routine advances to block 810, and the third-party service provider sends data to the subscription service management system indicating a selection to not offer the subscription-based service plan via the e-commerce site. Rather, the third-party service provider offers the subscription-based service plan via one or more consumer interfaces of the third-party service provider.

At block 812, the third-party service provider receives a consumer request via one of the consumer interfaces to receive a service corresponding to the subscription-based service plan. Moving to block 814, the third-party service provider sends an activation notification to the subscription service management system informing the subscription service management system that a subscription period associated with the consumer is to be activated. Proceeding to block 816, the third-party service provider receives one or more messages from the subscription service management system, each message indicating that a time-based trigger event has occurred. Continuing to decision block 818, the third-party service provider determines whether the subscription period associated with the consumer has ended. If the subscription service management system determines that the subscription period has not ended, the routine returns to block 816 and continues. On the other hand, if the third-party service provider determines that the subscription period has ended, the routine terminates at 820.

Figure 9:
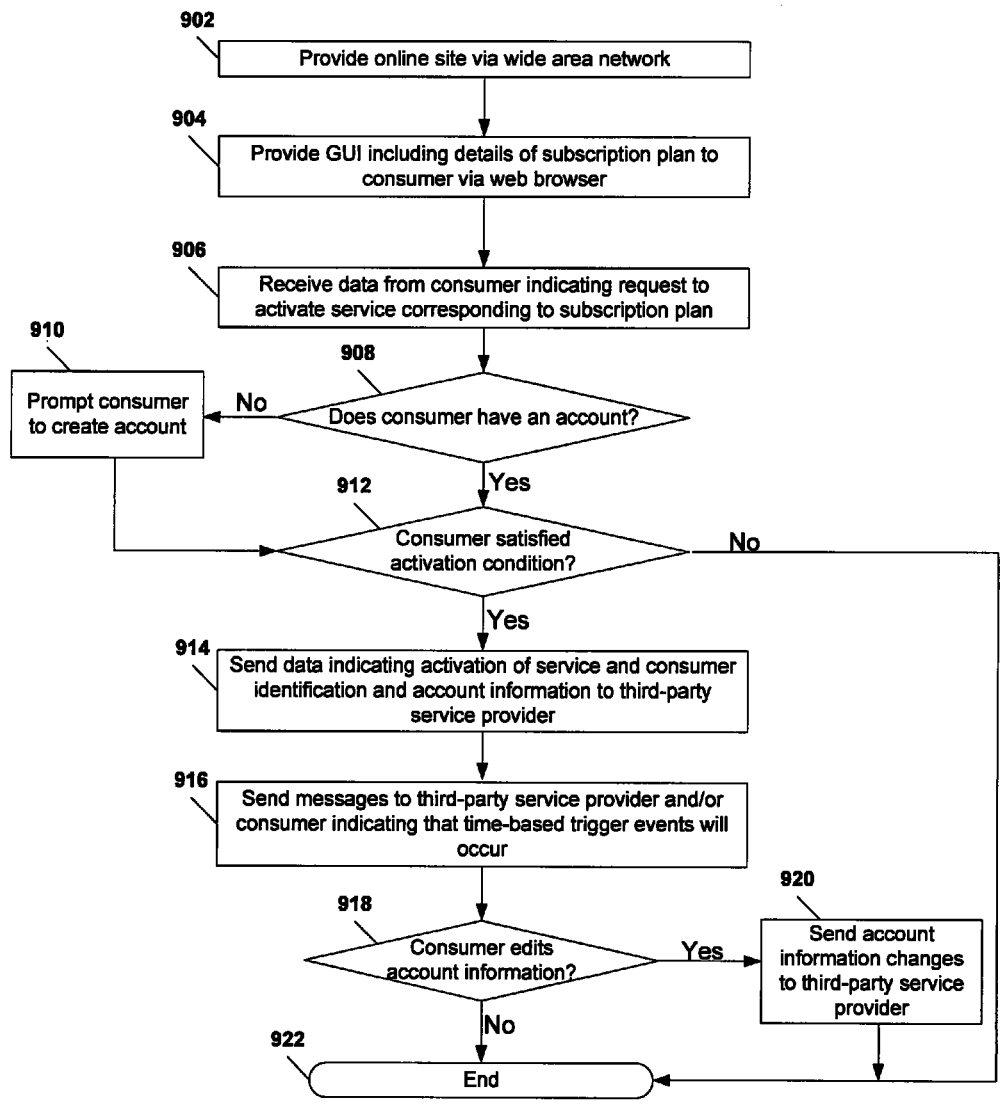
FIG. 9 is a flow diagram of a sixth particular embodiment of a routine for managing subscription-based services.

Referring to FIG. 9, a sixth particular embodiment of a routine for managing subscription services is illustrated. At block 902, a subscription service management system provides an online site via a network, such as the Internet. Moving to block 904, the subscription service management system provides a graphical user interface (GUI) to a consumer via a web browser, where the GUI includes details of a subscription-based service plan offered by a third-party service provider. In an illustrative embodiment, the subscription service management system provides the GUI in response to a selection of an identifier of the subscription-based service plan from search results or recommendations provided by the online site.

Proceeding to block 906, the subscription service management system receives data from the consumer indicating a request to activate a service corresponding to the subscription-based service plan. Continuing to decision block 908, in a particular embodiment, the subscription service management system determines whether the consumer has an account with the retailer. If the subscription service management system determines that the consumer does not have an account, the routine advances to block 910, and the subscription service management system prompts the consumer to create an account. The routine then moves to decision block 912.

At decision block 912, in a particular embodiment, the subscription service management system determines whether the consumer has satisfied an activation condition associated with the subscription-based service plan, such as an initial payment or providing data related to a valid credit card. If the subscription service management system determines that the consumer has not satisfied an activation condition, the routine terminates at 926. Alternatively, the subscription service management system prompts the consumer to satisfy the activation condition before the routine terminates. On the other hand, if the subscription service management system determines that the consumer has satisfied the activation condition, the routine proceeds to block 914, and the subscription service management system sends data indicating activation of a service corresponding to the subscription-based service plan. Additionally, the subscription service management system sends account information related to the consumer to the third-party service provider.

At block 916, in a particular embodiment, the subscription service management system sends one or more messages to the third-party service provider, the consumer, or any combination thereof, where each message indicates that a time-based trigger event, such as service increment or billing increment has occurred. Moving to decision block 918, the subscription service management system determines whether the consumer has edited his or her account information. If the subscription service management system determines that the consumer has edited his or her account information (e.g., billing address, shipping address, financial instrument data), the routine proceeds to block 920, and the subscription service management system sends changes to the account information to the third-party service provider. In one embodiment, the consumer can update account information via a one-click update feature provided via the online site, and the updated account information can be sent to all third-party service providers from whom the consumer receives subscription-based services. The routine terminates at 922.

Referring to FIG. 10A, a particular illustrative embodiment of a data structure to receive configuration data related to a subscription-based service plan is illustrated and designated generally 1002. The data structure 1002 can be a data structure of an application programming interface (API) to create a subscription-based service plan. The data structure 1002 includes a plurality of fields 1004, such as a service provider identification, a plan description, a soft descriptor, and other fields. Each field 1004 can relate to a data type 1006. For example, the subscription plan description can correspond to a character string data type. In another example, a Metadata field can relate to a MetadataRequest data type. A description 1008 of each of the fields is provided via the data structure 1002. The descriptions 1008 assists a third-party service provider in providing complete and accurate configuration data.

Referring to FIG. 10B, a second particular illustrative embodiment of a data structure to receive configuration data related to a subscription-based service plan is illustrated and designated generally 1002. The data structure 1002 can be a data structure that includes additional data objects related to creation of a subscription-based service plan. The data structure 1002 includes a plurality of fields 1004, such as fields related to a ScheduleItemRequest data type, fields related to an OfferRequest data type, fields related to a PromotionRequest data type, and fields related to other data types. Each field 1004 can relate to a data type 1006. A description 1008 of each of the fields is provided via the data structure 1002. The descriptions 1008 assists a third-party service provider in providing complete and accurate configuration data.

Referring to FIG. 11, a particular illustrative embodiment of a time-based queue is illustrated and designated generally 1100. The time-based queue 1100 includes a plurality of virtual queue positions 1102. Each virtual queue position 1102 is associated with a measure of time, such as a particular calendar date 1104. Further, one or more messages 1106 are placed in each virtual queue position. The messages 1106 relate to one or more time-based trigger events, such as service increments and billing increments, and are targeted to one or more service providers, consumers, or any combination thereof. Each of the messages 1106 includes information indicating that a trigger event has passed, is occurring or will occur within a pre-defined time period, according to messaging preferences designated by the third-party service provider.

Although the present specification describes components and functions that may be implemented in particular embodiments with reference to particular standards and protocols, the disclosed embodiments are not limited to such standards and protocols. For example, standards for Internet and other packet switched network transmission (e.g., TCP/IP, UDP/IP, HTML, HTTP) represent examples of the state of the art. Such standards are periodically superseded by faster or more efficient equivalents having essentially the same functions. Accordingly, replacement standards and protocols having the same or similar functions as those disclosed herein are considered equivalents thereof.

The illustrations of the embodiments described herein are intended to provide a general understanding of the structure of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be reduced. Accordingly, the disclosure and the figures are to be regarded as illustrative rather than restrictive.

One or more embodiments of the disclosure may be referred to herein, individually and/or collectively, by the term "invention" merely for convenience and without intending to voluntarily limit the scope of this application to any particular invention or inventive concept. Moreover, although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, will be apparent to those of skill in the art upon reviewing the description.

The Abstract of the Disclosure is provided to comply with 37 C.F.R. §1.72(b) and is submitted with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments. Thus, the following claims are incorporated into the Detailed Description, with each claim standing on its own as defining separately claimed subject matter.

The above-disclosed subject matter is to be considered illustrative, and not restrictive, and the appended claims are intended to cover all such modifications, enhancements, and other embodiments that fall within the true spirit and scope of the present invention. Thus, to the maximum extent allowed by law, the scope of the present invention is to be determined by the broadest permissible interpretation of the following claims and their equivalents, and shall not be restricted or limited by the foregoing detailed description.

What is claimed is:

1. A method of managing subscription-based services, the method comprising:
    receiving, by a computing device, configuration data from a third-party service provider at a subscription service management system, the configuration data indicating details of a subscription-based service plan to be fulfilled by the third-party service provider;
    receiving, by the computing device, a request from a consumer to receive a service corresponding to the subscription-based service plan, the request being received at the subscription service management system via an online site;
    initiating, by the computing device, a query for data indicating whether the third-party service provider, the consumer, the subscription-based service plan, and details of the subscription-based service plan are known to be associated with fraudulent activity, the query being associated with one or more fraud check procedures that include verifying a reputation associated with the third-party service provider and a reputation associated with the consumer;
    provided that no fraudulent activity is identified, activating, by the computing device, the service on behalf of the consumer, the consumer to receive the service during a subscription period; and
    sending, by the computing device, at least one message to the third-party service provider during the subscription period, the at least one message being related to a time-based trigger event associated with the subscription-based service plan.

2. The method of claim 1, further comprising receiving the configuration data from the third-party service provider via the online site.

3. The method of claim 1, wherein the consumer is to receive the service in a plurality of service increments during the subscription period and wherein the time-based trigger event is related to a next one of the plurality of service increments.

4. The method of claim 3, wherein the at least one message includes a service increment message that indicates a date, a time, or any combination thereof, at which the next one of the plurality of service increments is to be provided to the consumer.

5. The method of claim 3, further comprising:
    placing a plurality of service increment messages in a time-based queue at the subscription service management system, each of the plurality of service increment messages indicating a date, a time, or any combination thereof, at which one of the plurality of service increments is to be provided to the consumer; and
    automatically sending each of the plurality of service increment messages from the time-based queue to the third-party service provider.

6. The method of claim 1, wherein the querying further requests data indicating an accuracy of identification data or financial account information received at the subscription service management system.

7. The method of claim 1, further comprising:
    performing the one or more fraud check procedures associated with the third-party service provider, the consumer, and the subscription-based service plan; and
    activating the service based at least in part on data resulting from the one or more fraud check procedures.

8. The method of claim 7, wherein the one or more fraud check procedures include verifying identities and other attributes associated with the third-party service provider and the consumer.

9. The method of claim 7, wherein the one or more fraud check procedures include querying for data indicating an accuracy of identification data or financial account information associated with the third-party service provider and the consumer and received at the subscription service management system.

10. A subscription service management system to manage subscription-based services, the subscription service management system comprising:
    a server system having logic and memory accessible to the logic, wherein the memory includes instructions executable by the logic to:
        receive configuration data from a third-party service provider, the configuration data indicating details of a subscription-based service plan to be fulfilled by the third-party service provider;
        receive a request from a consumer for a service corresponding to the subscription-based service plan;
        perform one or more fraud check procedures prior to activating a subscription period associated with the consumer, the one or more fraud check procedures including verifying a reputation of the third-party service provider, a reputation of the consumer, and a reputation of the subscription-based service plan;
        activate the subscription period when it is determined that no fraudulent activity is identified during the one or more fraud check procedures, the consumer to receive the service in a plurality of service increments during the subscription period; and
        provide at least one message to the third-party service provider during the subscription period, the at least one message being related to a time-based trigger event associated with the subscription-based service plan.

11. The system of claim 10, wherein the one or more fraud check procedures include:
 verifying identities, reputations, and other attributes of the third-party service provider and the consumer; or
 querying for data indicating an accuracy of identification data and financial account information associated with the third-party service provider and the consumer.

12. Computer-readable storage media having computer-executable instructions that, when executed by one or more processors, perform operations comprising:
 receiving, from a consumer and by a subscription service management system, a request for a service associated with a subscription-based service plan provided by a third-party service provider;
 determining that identification data or financial account information associated with the consumer and the third-party service provider is accurate;
 performing one or more fraud check procedures associated with the third-party service provider and the consumer, the one or more fraud check procedures including verifying a reputation of the third-party service provider and a reputation associated with the consumer;
 at least partly in response to determining that the identification data or the financial account data is accurate, and based at least partly on the one or more fraud check procedures, activating a subscription period corresponding to the service; and
 in response to detecting a time-based trigger event associated with the subscription-based service plan, providing the service during the subscription period.

13. The computer-readable storage media of claim 12, wherein the service is based on configuration data provided by the third-party service provider.

14. The computer-readable storage media of claim 13, wherein the configuration data indicates details of the subscription-based service plan to be fulfilled by the third-party service provider.

15. The computer-readable storage media of claim 12, wherein the one or more fraud check procedures include verifying identities associated with the third-party service provider and the consumer.

16. The computer-readable storage media of claim 12, wherein the one or more fraud check procedures include querying for data indicating whether the third-party service provider, the consumer, the subscription-based service plan, and details of the subscription-based service plan are known to be associated with fraudulent activity.

17. The computer-readable storage media of claim 12, wherein the consumer does not receive the service if it is determined that the third-party service provider, the consumer, or the subscription-based service plan is associated with fraudulent activity.

* * * * *